Aug. 6, 1929. A. V. LIVINGSTON 1,723,285
VEHICLE DRIVING APPARATUS AND SYSTEM
Original Filed June 6, 1925 2 Sheets-Sheet 1

Patented Aug. 6, 1929.

1,723,285

UNITED STATES PATENT OFFICE.

ALAN VARLEY LIVINGSTON, OF ENGLEWOOD, NEW JERSEY, ASSIGNOR TO THE SAFETY CAR HEATING & LIGHTING COMPANY, A CORPORATION OF NEW JERSEY.

VEHICLE DRIVING APPARATUS AND SYSTEM.

Application filed June 6, 1925, Serial No. 35,498. Renewed November 10, 1928.

This invention relates to apparatus for transmitting power, and more particularly to the transmission of power from a prime mover to the driving wheels or axles of a vehicle such as a locomotive, for example.

One of the objects of this invention is to provide a system and apparatus for transmitting power from a prime mover to a load, capable of achieving a high degree of efficiency of transmision and capable also of automatically attaining such a high degree of efficiency even though varying conditions be imposed thereon by the load or by the prime mover. Another object is to provide a thoroughly practical and simple apparatus for transmitting power from a prime mover to the driving wheels or axles of a vehicle, capable of embodiment in rugged apparatus, and of dependable action and reliable operation. Another object is to provide a system and apparatus of the above-mentioned nature which will be of an action highly sensitive to varying conditions of operation tending to cause a departure from the intended efficiency of operation of the apparatus and system. Another object is to provide a system and apparatus of the above-mentioned type in which the varying and hard conditions of practical use, such as are met with particularly in the transmision of power from a prime mover to the driving wheels or axles of the vehicle, may be met in a thoroughly practical and dependable manner. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
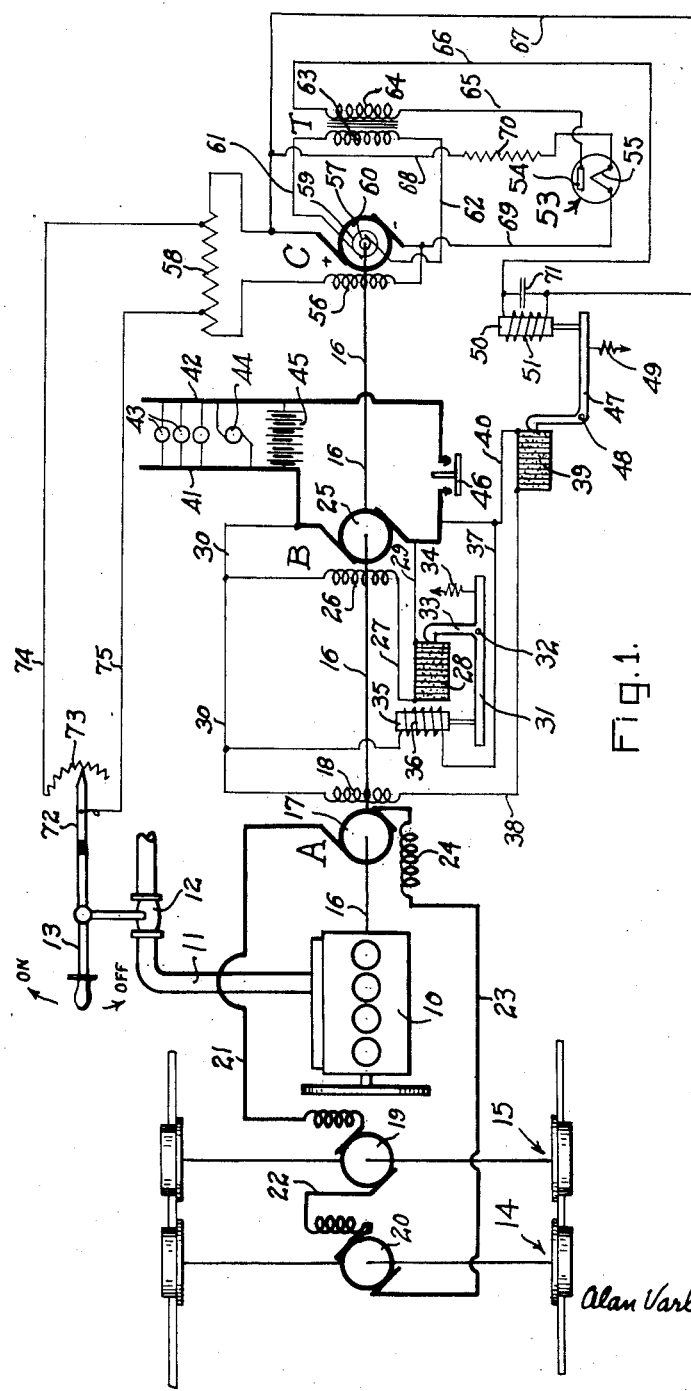
Figure 2:
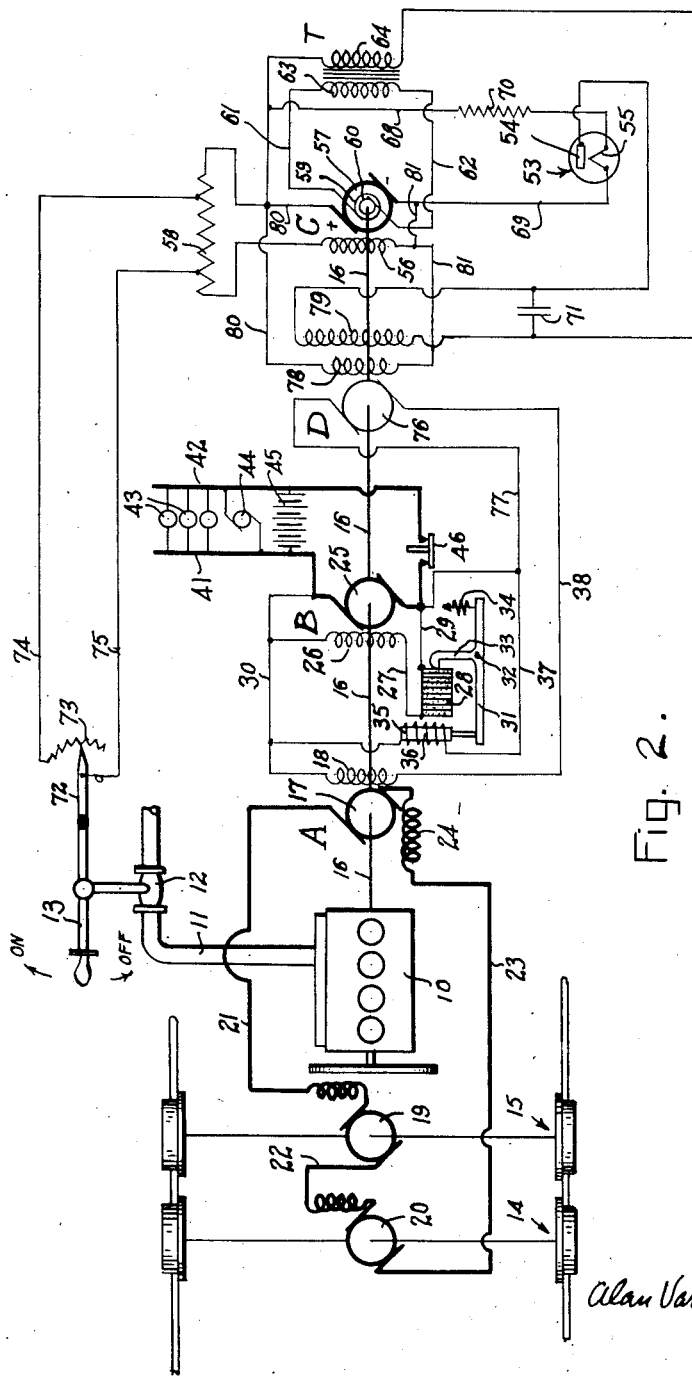

In the accompanying drawings, in which are shown several of various possible embodiments of this invention, Figure 1 is a diagrammatic showing of the apparatus and circuit arrangements of a preferred embodiment of my invention; and Fig. 2 is a like diagrammatic representation of the apparatus and circuit arrangements illustrative of a possible modified form of certain features of my invention.

Similar reference characters refer to similar parts throughout the several views in the drawings.

As conducive to a clearer understanding of certain features of this invention, I may note at this point that there are a number of highly desirable practical advantages in the use of a prime mover, such as an internal combustion engine to be operated by gas or oil as a source of energy for driving vehicles such as locomotives for railway service; but the character of the load imposed upon a prime mover in such a relation is characterized by such variations in speed and magnitude that such advantages may be achieved only partially or may be achieved by way of a sacrifice in efficiency. Accordingly, a dominant aim of this invention is to provide a thoroughly practical apparatus and system by means of which such advantages may be achieved fully.

Referring now to the drawing, there is shown at 10 a prime mover preferably in the form of a gas or oil internal combustion engine; the latter is adapted to be supplied with appropriate fuel from any convenient source, as by the conduit 11, the latter being provided with a throttle 12 for controlling at will the supply of fuel to the prime mover 10, and hence to control the power output of the latter. The throttle or valve 12 is provided with the handle 13 for manual control thereof. The prime mover 10 and its associated apparatus may be mounted in any suitable manner upon the vehicle to be driven, only two pairs of wheels and associated axles 14 and 15 of the latter being shown in the drawing, for the sake of simplicity of illustration.

The prime mover 10 is provided with a driving shaft diagrammatically shown at 16, and operatively driven from the shaft 16 is the armature 17 of a generator generally indicated at A. The generator A is provided with an exciting field winding energized or excited preferably in a manner more clearly set forth hereinafter, and the output of the generator A supplies energy for driving one or more motors connected to the load to be driven, as, for example, connected to one or more of the axles or wheels of the vehicle. Thus, at 19 is diagrammatically indicated a motor operatively connected to the axle 15, and at 20 is indicated a motor connected to the axle 14. The motors 19 and 20 may take any suitable or appropriate form, and by way of illustration are shown in the drawing as being of the series type. If more than one driving motor is employed, for example, the two motors 19 and 20, as shown in the drawing, the motors may be connected to the generator A in any suitable or appropriate manner and in the drawing are illustratively shown as serially connected. Thus a conductor 21 leads the current output of the generator A to the motor 19, the current thence passing through the motor 19, then by way of conductor 22 to motor 20, and through the motor 20 and thence by way of conductor 23 back to the generator A. Preferably the generator A, to achieve certain advantages hereinafter described, is provided, in addition to the exciting field winding 18, with a differential field winding, and in the drawing the latter is indicated at 24 and as will be clear from the drawing, it will be seen that the current passing from the generator into or through the motor circuit or circuits passes through this differential field winding 24. The output energy of the generator A will thus be seen to be directly transmitted to the driving motors, and with this arrangement it will further be seen that simplicity of arrangement and absence of switching and control devices may be achieved.

Considering now the manner in which the exciting field winding 18 of the generator A is energized, it will be noted first that driven from the prime mover 10 and preferably connected directly thereto, as through the extended driving shaft thereof, is an exciter generator generally indicated at B, and as shown in the drawing the armature 25 of the exciter generator B is directly connected to the driving shaft 16 of the prime mover 10. The exciter generator B is preferably of the shunt wound type, and is hence provided with a shunt field winding 26; the circuit of this shunt winding 26 will be seen to extend from one terminal of the armature 25 of the generator B, thence through the field winding 26, and by way of conductor 27 through a variable resistance, taking the form preferably of a compressible carbon pile 28, and thence by way of conductors 29 and 30 back to the other terminal of the generator B.

The carbon pile 28 has associated with it a bell crank lever 31, pivoted as at 32, and provided with an upwardly extending arm 33 which bears against the free or unanchored end of the carbon pile 28. The spring 34 appropriately connected to the lever 31 tends to swing the lever 31 about its pivot 32 in such a direction that the compression of the carbon pile 28 is increased. At one end of the lever 31 there is connected a core 35 forming part of a solenoid, the coil 36 of which is connected by conductors 30 and 37 to the respective terminals of the armature 25 of the exciter generator B. With the arrangement thus far described in connection with the exciter generator B, the voltage of the output of the generator B will be maintained substantially constant irrespective of changes in the speed of drive of the armature 25 of the generator B, due to changes in the speed of the prime mover or internal combustion engine 10. A tendency to raise the voltage of the exciter generator B, due to an increase in the speed of the generator, is at once met by an increase in the resistance of the carbon pile 28 with a consequent and commensurate decrease in the exciting field current of the generator B. A decrease in speed of the exciter generator B will bring about a reverse action, and thus constancy of voltage of the output of the exciter generator B will be seen to be maintained. The voltage of the output of the generator B is such that it is sufficient to supply the exciting field winding 18 of the main generator A with ample excitation and to meet the maximum requirements in this respect of the main generator A.

The exciter generator B supplies exciting current to the field winding 18 through a circuit which will be seen to extend from one terminal of the generator B, thence by way of conductor 30 to one terminal of the main field winding 18 of the generator A, through the winding 18 and thence by way of conductor 38, a variable resistance 39 preferably in the form of a carbon pile, and conductor 40 to the other terminal of the generator B.

Before considering in detail the control of the excitation supplied to the field winding 18 of the generator A, it may at this point be noted that apparatus of this general nature must be and usually is equipped with various auxiliary apparatus and devices; the latter may include motors for driving air compressors to supply air to the air-brake system of the vehicle or train, or for supplying air under pressure to the prime mover for various purposes, motors for driving blowers or the air cooling of any of the electrical or mechanical equipment, and such additional or auxiliary devices may also include a lighting circuit for illumination of the vehicle or train. Also, various control devices may be electrically operated, and in order to insure the supply of energy to certain or all of the auxiliaries mentioned hereinabove by way of example, when the prime mover is at rest, I provide a storage battery which may be charged while the prime mover is operating, and may form the supply of energy to these devices when the prime mover is at rest. Such apparatus or devices either require a constant voltage supply of electrical energy and particularly in the case of storage battery, such a supply of energy is of material advantage in insuring the proper charge of the battery and protect the latter against overcharge. As hereinbefore noted, the exciter generator B I have arranged to have controlled so that its output is of substantially constant voltage, and I make this generator B of sufficient capacity to supply energy to such auxiliaries as are mentioned above.

Turning to the drawing, I have shown diagrammatically and by way of example a power circuit including the conductors 41 and 42, connected to the terminals of the exciter generator B; to this power circuit 41—42, and hence to the exciter generator B, may be connected, to be supplied with energy therefrom, the various auxiliary devices or apparatus. Among the latter, I have shown by way of example a series of lamps 43, a motor 44 of any suitable type, as illustrative of a possible auxiliary motive unit for driving a compressor or blower, for example, and a storage battery 45. The substantially constant voltage of the energy supplied by the exciter generator B permits not only the operation of auxiliary motive units at a voltage most appropriate thereto and hence at their intended efficiency, but also insures an adequate charging of the battery 44 and the automatic safeguarding of the latter against over-charge. The lamps 43 which are illustrative of the lighting circuit of either the vehicle or train as a whole, may furthermore be thus supplied with energy at substantially constant voltage, and as to all of the auxiliary translating devices associated with the power circuit 41—42, it will be seen that the battery 45 may function as the source of energy supply thereto during periods of inactivity of the prime mover 10 and hence of the generator B. Any suitable form of automatic switch diagrammatically shown at 46 may be employed to connect or disconnect the generator B to the power circuit 41—42 in accordance with the activity or inactivity respectively of the generator B.

Considering now in detail the control of the excitation of the winding 18 of the main generator A, it is first to be noted that the free or unanchored end of the carbon pile 39, which is arranged to control the flow of exciting current in the field winding 18, has related to it a bell crank lever 47 pivoted as at 48, a spring 49 being connected to the lever 47 so as to tend to swing the lever 47 in clockwise direction and thus to relieve the pressure on the carbon pile 39. Connected to the lever 47, however, is a core 50 of a solenoid, the winding 51 of which is arranged to be energized from an auxiliary generator C, preferably arranged to be driven by the prime mover 10, and hence conveniently connected to the shaft 16 thereof, and to be controlled by a thermionic device 53 which may conveniently take the form of a two-element vacuum tube having therein a plate 54 and a filament 55.

The auxiliary generator C is preferably self-excited and is conveniently of the shunt-wound direct-current type. There is accordingly provided for the generator C a shunt field winding 56 connected across the terminals of the armature 57 but preferably through a resistance 58. The generator C, however, is also provided with a pair of slip rings 59 and 60 in order that it may provide a convenient source of alternating current. Coacting with the slip rings 59—60 are appropriate brushes, and across these brushes, as by the conductors 61 and 62, is connected the primary winding 63 of a transformer T, the secondary winding 64 of which is so proportioned with respect to the primary winding 63 that the voltage of the alternating current output of the generator C may be conveniently stepped up to a value appropriate to the operating characteristic of the thermionic device 53.

One terminal of the secondary winding 64 is connected by conductor 65 to the plate 54 of the device 53; the other terminal of the secondary winding 64 is connected by conductor 66 to one terminal of the solenoid 51, the other terminal of which is connected by conductor 67 to one of the brushes (the positive) coacting with the commutator 57 of the generator C. But the filament 55 of the device 53 is connected by conductors 68 and 69 directly across the brushes of the direct current output side of the generator C (but preferably through an appropriate resistance 70), and thus the circuit of the solenoid 51 will be seen to be completed but with the electron path of the device 53 included therein. A suitable condenser 71 is bridged across the terminals of the solenoid winding 51 in order to smooth out the pulsations of the current energizing this winding, the frequency of which may be of any suitable value.

As already hereinbefore noted, the power output of the prime mover 10 may be controlled as by the lever 13 which in turn controls the valve 12, the latter determining the flow of fuel to the internal combustion engine 10. Associated with the lever 13 is a current-controlling device preferably in the form of a resistance arranged to be varied or changed as the lever 13 is moved. Thus, for example, the lever 13 may carry a contact member 72 arranged to coact with a resistance 73, this current-controlling device 72—73 being shunted as by the conductors 74 and 75 across a portion of the resistance 58. And thus it will be seen that as the lever 13 is moved to increase the supply of fuel to the prime mover 10 the resistance of the field circuit of the auxiliary generator C is increased, thus to cause a decrease in the excitation of the generator C and therefore to necessitate a slightly greater speed of rotation of the armature 57 thereof to cause the voltage of the generator C to return to its normal or intended value.

Considering now the operation of the apparatus and system illustrated in Fig. 1, it may first be pointed out that efficiency of transmission of power from the prime mover 10 to the load is dependent to a substantial extent upon the speed of the prime mover itself, and to maintain the desired efficiency of transmission a corresponding speed of rotation of the internal combustion engine should be maintained. For example, the load imposed upon the prime mover 10 by the vehicle being driven is subject to wide variations; and since it is desirable to control the locomotive or vehicle in such a simple manner as is made feasible by the use of the throttle lever 13 alone, it is not infrequent that conditions will often arise where the efficiency of transmission of the prime mover becomes detrimentally affected. For example, should the vehicle or locomotive or train driven thereby approach an up-grade, then the load on the system and apparatus becomes not only substantial in magnitude but also of increasing value, and any failure of the internal combustion engine to "pick up" rapidly enough brings about conditions of great inefficiency because the increased or increasing load on the prime mover acts primarily to reduce its speed and thus make still more difficult the rapid picking up of the engine. But such defects and disadvantages are effectively avoided by means of this invention.

Assuming first conditions of substantial constancy of load, the prime mover 10 may first be assumed to be operating at a given intended speed, predetermined by the inherent design of the prime mover itself. The exciter generator B will be supplying energy at substantially constant voltage to the power circuit 41—42 and, as in the preferred arrangement, will also supply exciting current to the field winding 18 of the main generator A. The carbon pile 39, however, under the control of the solenoid 50—51, will determine the magnitude of the exciting current flowing to the field winding 18. This solenoid 50—51 and its associated magnetic circuit are constructed in any suitable manner so that at any point within the intended range of movement of the core 50 the latter will remain in equilibrium when the normal or intended voltage is impressed upon the coil 51 of the solenoid. The substantial constancy of load upon the prime mover 10, as hereinabove assumed, will cause the generator C to be driven at substantially constant speed; the incandescence of the filament 55 will thus be substantially constant; and the voltage in the plate circuit of the thermionic device 53, and hence the voltage impressed upon the winding 51 of the solenoid 50—51, will likewise be substantially constant; and thus, as long as the condition of constancy of load is maintained, the field winding 18 of the main generator A will receive a predetermined energizing current.

Assuming, however, that the load on the driving motor or motors 19—20 is increased, due, for example, to the vehicle or locomotive beginning to ascend an up-grade in its path of travel, the resultant increase in the load upon the generator A, and hence upon the prime mover 10, results in a marked tendency to decrease the speed of the internal combustion engine 10. But the increased current flowing to the driving motors 19—20 is effective through the differential field winding 24 to decrease the excitation of the generator A to some extent and thus partly to relieve the prime mover of its increasing load. But the reduction in speed of the prime mover, even if substantially momentary, reduces the output voltages of the auxiliary generator C and the latter thus causes a decreased incandescence (or electron emission) of the filament 55 of the thermionic device 53 and also decreases the voltage effective in the plate circuit of this device. These effects, either individually or jointly, cause to a much greater extent a decrease in the plate current and hence a decrease in the energization of the winding 51 of the solenoid 50—51, and the spring 49 is thus promptly permitted to increase the resistance of the carbon pile 39 and thus promptly materially to reduce the excitation supplied the field winding 18 of the main generator A. The output of the latter is thus promptly diminished, and the load imposed thereby upon the prime mover 10 likewise decreased so that the internal combustion engine 10 is permitted promptly to increase its speed. The speed of the prime mover 10 may thus be promptly brought back to normal, the sensitive action of the thermionic device 53 promptly preventing an abnormal increase in speed by reason of the fact that an increase in speed is accompanied not only by an increase in the plate voltage but also by an increase in the electron emission of the filament of the thermionic device 53, these effects acting to strengthen the solenoid winding 51 so that the excitation of the generator A is increased to impose such a load on the prime mover 10 that the speed of the latter is maintained substantially constant.

Thus the speed of the prime mover 10 may be automatically maintained at its intended or normal value so that the desired efficiency may be dependably realized, but more particularly the above described action insures maintaining the prime mover 10 in such a condition of speed that it may promptly respond and pick up to an increased supply of fuel thereto resulting from an operation of the throttle lever 13, and thus the danger of giving rise to a constantly decreasing efficiency of operation of the engine, due to its failure to pick up at the exact moment when not only great power output but also maximum efficiency of operation are most needed, is effectively precluded.

But in order to achieve more effectively the advantages just outlined above, a movement of the throttle lever 13 in a direction to increase the fuel supply to the prime mover 10 is accompanied by an increase in the resistance in the exciting field circuit of the generator C so that the excitation of the auxiliary generator C is decreased. There is thus imposed upon the generator C, by reason of the resultant decrease in voltage of its output, a condition analogous to a decrease in the speed of the engine 10 itself, and the sensitive action of the thermionic device 53, promptly responsive to such a decrease in voltage of the output of the generator C, is made promptly effective to weaken the solenoid winding 51 and thus to permit an increase in the speed of the engine 10 to take place substantially coincidentally with the increase in the fuel supply thereto. An immediate increase in speed of the engine 10 may thus take place, and the engine is thus placed promptly in more effective condition to respond to the increased fuel supply, and the prime mover 10 will thus be seen to be promptly conditioned to yield a large power output and at high efficiency at the moment when both are desired. And I may so proportion the several parts coacting with the auxiliary generator C, as well as the change in the excitation of the latter generator by the throttle lever 13, that any intended or desired power-output-speed characteristic of the internal combustion engine may be achieved, and it will be seen that the sensitive action brought about by the thermionic device prevents the interpositioning of time intervals in the operation of the apparatus and system and during which loss of power and decrease in efficiency may otherwise and with detrimental results take place.

In Fig. 2, in which I have illustrated a possible modified form of this invention, I have shown the main field winding 18 of the generator A supplied with exciting current from the exciter generator B, but in order to control the magnitude of the exciting current I have provided an auxiliary generator D preferably driven from the shaft 16 of the prime mover 10. The circuit supplying exciting current to the field 18 of the main generator A will be seen to extend from one terminal of the generator B, then by way of conductor 30 to and through the field winding 18, thence by way of conductor 38 to one terminal or brush of the armature 76 of the auxiliary generator D, through the armature 76, and from the other brush or terminal of the generator D by way of conductors 77 back to the other terminal of the generator B.

The generator D is provided with two field windings 78 and 79; the former is connected by conductors 80 and 81 directly across the brushes of the armature 57 of a generator substantially identical in construction and arrangement with the generator C hereinbefore described in connection with Fig. 1, and for convenience also referred to in connection with Fig. 2 as generator C. The other field winding 79 of the generator D is arranged to act in opposition to the field winding 78 and is connected in the plate circuit of a thermionic device substantially identical to and arranged similarly as the thermionic device 53 of Fig. 1, and hence designated in Fig. 2 as 53. In other respects the associated circuit arrangements are similar to those associated with the generator C of Fig. 1, and the parts thereof are similarly designated in Fig. 2. Considering the operation of the arrangement shown in Fig. 2, it may first be pointed out that under the conditions of constancy of load upon the prime mover 10, and hence of substantially constant speed of not only the prime mover 10 but also of the generator C, the parts associated with the latter generator and supplied with energy thereby are so adjusted or arranged that the field windings 78 and 79 of the generator D substantially neutralize one another, and the excitation supplied to the main generator A will be at a voltage determined substantially by the exciter generator B. Assuming, however, that an increase in load on the prime mover causes the speed of the latter to decrease, a like decrease in speed will characterize the operation of the generator C. Such a decrease in speed, however, decreases not only the electron emission of the filament 55 of the device 53 but also diminishes the effective voltage in the plate circuit of this device; thus the exciting current flowing through the field winding 79 of the auxiliary generator D becomes promptly diminished, and in fact becomes diminished at a greater rate, because of the characteristics of the thermionic device 53, than is the rate of diminution in the current supplied to the winding 78 from the direct current output of the generator C, due to the decrease in speed of the latter. The field winding 78 is thus at once brought into predominance, and the generator D caused to produce a voltage in such a direction as to oppose the flow of exciting current from the generator B to the exciting winding 18, with the result that the decreased excitation supplied the main generator A so relieves the load upon the prime mover 10 that the speed of the latter may be promptly increased.

An abnormal increase in the speed of the prime mover 10, however, is prevented by an action substantially the reverse of what has hereinabove been set forth, the increased speed of the generator C causing, by reason of the sensitive action of the thermionic device 53, a much more rapid rate of increase in the excitation of the field winding 79 than is produced in the field winding 78, so that the winding 79 becomes preponderant to cause the generator D to produce an E. M. F. in such a direction as to aid the generator B in supplying excitation current to the main generator A. Thus the output of the generator A and the load on the prime mover 10 is increased so as to maintain the speed of the latter within the intended range. And thus it will be seen that a decrease in speed of the prime mover 10, due to a tendency for the load thereon to be increased, is effectively prevented and the internal combustion engine is thus effectively maintained in a condition wherein it may readily "pick up" in response to an increased fuel supply thereto.

A subsequent operation of the throttle lever 13, as for example to increase the fuel supply to the prime mover 10 when the load on the system is increased, due for example to the vehicle or train meeting an up-grade in its path of travel, is made to increase the resistance in the field circuit of the auxiliary generator C, and the resultant decrease in the excitation of the latter imposes upon this generator a condition analogous to a decrease in speed thereof. The change in the voltage of both its A. C. and D. C. output is at once made to affect the field windings 78 and 79 of the auxiliary generator D, but, as hereinbefore noted, the thermionic device 53 causes a change in the current flow in the circuit of winding 79 to take place which is, due to the characteristics of the vacuum tube, proportional substantially to the third power or greater of the voltage applied to the tube, whereas the change in excitation in the winding 78 is one proportional substantially to the first power of the voltage applied thereto. The winding 79 is thus quickly and promptly brought into predominance, and, by an action which will be understood from the foregoing, causes a decrease in the load on the prime mover 10 to take place so that the latter may increase its speed and thus be conditioned appropriately to respond to the increased fuel supply thereto. Thus the conditioning of the prime mover as to its speed substantially simultaneously, due to the sensitive and prompt action of the thermionic device, with a movement of the throttle lever to increase the fuel supply, effectively guards against failures of the prime mover 10 to promptly pick up, and insures power outputs of large magnitude and at high efficiencies at the exact moments when both are most desired and essential to cope with the changing condition of the load imposed upon the apparatus or system.

It will thus be seen that there has been provided in this invention a system and apparatus in which the several objects hereinbefore noted, as well as many thoroughly practical advantages, are successfully achieved. It will moreover be seen that the apparatus and system is highly sensitive and promptly responsive to either manually imposed changes or changes substantially uncontrollable and such as are characteristic of a traction load, and that thus highly efficient operation and thoroughly dependable action may be realized throughout the varying conditions which the apparatus and system must in practice meet.

As many possible embodiments may be made of the above invention, and as many changes might be made in the embodiments above set forth, it is to be understood that all matter hereinbefore set forth or shown in the accompanying drawings, is to be interpreted as illustrative and not in a limiting sense.

I claim as my invention:

1. In apparatus of the character described, in combination, a vehicle carrying an internal combustion engine and a generator driven thereby, a motor for driving said vehicle and supplied with energy from said generator, an auxiliary generator driven by said engine and arranged to have a function of its output vary substantially with the speed of said engine, and means responsive to a change in the function of said output but adapted to vary in response thereto at a greater rate and arranged upon a decrease in the speed of said engine to decrease the load on said main generator.

2. In apparatus of the character described, in combination, a vehicle carrying an internal combustion engine and a generator driven thereby, a motor for driving said vehicle and supplied with energy from said generator, an auxiliary generator driven by said engine and arranged to have a function of its output vary substantially with the speed of said engine, means for controlling the excitation of said main generator, and a thermionic device responsive to a change in the function of the output of said auxiliary generator for controlling said last-mentioned means.

3. In apparatus of the character described, in combination, a vehicle carrying an internal combustion engine and a generator driven thereby, a motor for driving said vehicle and supplied with energy from said generator, an auxiliary generator driven by said engine and arranged to have a function of its output vary substantially with the speed of said engine, a thermionic device having included therein an electrode and a filament, said filament being connected to be responsive to the said function of the output of said auxiliary generator, and means for controlling the excitation of said main generator and arranged to be affected by changes in a function of the output of said thermionic device and in circuit with an electrode of said device.

4. In apparatus of the character described, in combination, a vehicle carrying an internal combustion engine and a generator driven thereby, a motor for driving said vehicle and supplied with energy from said generator, an auxiliary generator driven by said engine and arranged to have a function of its output vary substantially with the speed of said engine, a thermionic device connected to have its plate circuit affected by changes in the said function of the output of said auxiliary generator, and means in circuit with said thermionic device for affecting the excitation of said main generator.

5. In apparatus of the character described, in combination, a vehicle carrying an internal combustion engine and a generator driven thereby, a motor for driving said vehicle and supplied with energy from said generator, an auxiliary generator driven by said engine and arranged to supply two different voltages, means for controlling the excitation of said main generator, and a thermionic device connected to have its filament excited by one of the voltages of said auxiliary generator and having included in its plate circuit said excitation controlling means and a function of the other voltage produced by said auxiliary generator.

6. In apparatus of the character described, in combination, a vehicle carrying an internal combustion engine and a generator driven thereby, a motor for driving said vehicle and supplied with energy from said generator, means driven by said engine and arranged to supply a uni-directional E. M. F. and an alternating E. M. F. and adapted to have said E. M. F.'s vary substantially with the speed of said engine, means including a winding for controlling the output of said main generator, and a thermionic valve having its filament energized by the uni-directional E. M. F. supplied by said means and having included in its plate circuit said winding and a function of the alternating E. M. F. supplied by said means.

7. In apparatus of the character described, in combination, a vehicle carrying an internal combustion engine and a generator driven thereby, a motor for driving said vehicle and supplied with energy from said generator, a variable resistance for controlling the output of said main generator, a coil for controlling said variable resistance, a thermionic device having said coil in circuit with an electrode thereof, and means responsive to speed changes of said engine for affecting the action of said thermionic device.

8. In apparatus of the character described, in combination, a vehicle carrying an internal combustion engine and a generator driven thereby, a motor for driving said vehicle and supplied with energy from said generator, an auxiliary generator driven by said engine and arranged to have a function of its output vary substantially with the speed of said engine, means responsive to a change in the function of said output but adapted to vary in response thereto at a greater rate and arranged upon a decrease in the speed of said engine to decrease the load on said main generator, a throttle for controlling the fuel supply of said engine, and means responsive to the operation of said throttle adapted to change the standard of operation of said auxiliary generator.

9. In apparatus of the character described, in combination, a vehicle carrying an internal combustion engine and a generator driven thereby, a motor for driving said vehicle and supplied with energy from said generator, a variable resistance for controlling the output of said main generator, a coil for controlling said variable resistance, a thermionic device having said coil in circuit with an electrode thereof, means responsive to speed changes of said engine for affecting the action of said thermionic device, a throttle for controlling the fuel supply to said engine, and means responsive to the operation of said throttle adapted to change the standard of operation of said speed responsive means.

10. In apparatus of the character described, in combination, a vehicle carrying a prime mover and a generator driven thereby, a motor for driving said vehicle and supplied with energy from said generator, and thermionic means arranged upon an increase in the load on said prime mover to increase the speed of said prime mover.

11. In apparatus of the character described, in combination, a vehicle carrying a prime mover and a generator driven thereby, a motor for driving said vehicle and supplied with energy from said generator, means for causing a decrease in the output of said generator, and means responsive to an increase in the load on said prime mover but at a rate different from the rate of increase in load for affecting said first-mentioned means.

12. In apparatus of the character described, in combination, a vehicle carrying a prime mover and a generator driven thereby, a motor for driving said vehicle and supplied with energy from said generator, thermionic means responsive to an increase in the load on said prime mover to increase the speed of said prime mover, control means arranged to permit an increase in the output of said prime mover, and means responsive to the operation of said control means for changing the standard of operation of said thermionic means.

13. In apparatus of the character described, in combination, a prime mover and a load driven therefrom, means for cutting down the energy output of said prime mover, and means effective upon a predetermined increase in the said load to affect said first-mentioned means to cause the latter to cut down the energy output of said prime mover but at a greater rate than the rate of increase in the said load.

14. In apparatus of the character described, in combination, a prime mover and a load driven therefrom, and means including a thermionic device effective upon a predetermined increase in the said load to cause a decrease in the energy output of said prime mover.

15. In apparatus of the character described, in combination, a prime mover, a load driven therefrom, power transmission means interposed therebetween and means including a thermionic device effective to prevent said transmission means, upon an increase in the said load, from increasing the load on said prime mover.

16. In apparatus of the character described, in combination, a prime mover, a load driven therefrom, means for causing an increase in the speed of said prime mover, and means disproportionately responsive to an increase in the said load for affecting said first-mentioned means to cause the latter to effect an increase in the speed of said prime mover at a substantially greater rate than the rate of increase in the said load.

17. In apparatus of the character described, in combination, a prime mover, a load driven therefrom, power transmission means interposed therebetween, a thermionic device for controlling the effectiveness of said power transmission means, and means responsive to speed changes in said prime mover for affecting said thermionic device.

18. In apparatus of the character described, in combination, a prime mover, a load driven therefrom, power transmision means interposed therebetween, a thermionic device for controlling the effectiveness of said power transmission means, and an auxiliary generator driven by said prime mover and arranged to have a function of its output vary with changes in speed of said prime mover, said thermionic device being connected to be responsive to the change in function in the output of said auxiliary generator.

19. In apparatus of the character described, in combination, a prime mover, a load driven therefrom, power transmission means interposed therebetween, a thermionic device for controlling the effectiveness of said power transmission means, means responsive to speed changes in said prime mover for affecting said thermionic device, means for controlling the fuel supplied to said prime mover, and means responsive to an operation of said fuel controlling means arranged to change the standard of operation of said speed responsive means.

20. In apparatus of the character described, in combination, a prime mover, a load driven therefrom, power transmission means interposed therebetween, a thermionic device for controlling the effectiveness of said power transmission means, an auxiliary generator driven by said prime mover and arranged to have a function of its output vary with changes in speed of said prime mover, said thermionic device being connected to be responsive to the change in function in the output of said auxiliary generator, a throttle valve for controlling the fuel supplied to said prime mover, and means responsive to the operation of said throttle valve for changing the standard of operation of said auxiliary generator.

21. In apparatus of the character described, in combination, an internal combustion engine, a generator driven thereby, a load supplied by said generator, an exciter for supplying excitation current to said generator, a thermionic device for controlling the excitation current supplied from said exciter, and means responsive to speed changes of said engine for affecting said thermionic device.

22. In apparatus of the character described, in combination, an internal combustion engine, a generator driven thereby, a load supplied by said generator, an exciter for supplying excitation current to said generator, a winding for controlling the excitation current supplied by said exciter, a thermionic device in circuit with said winding, and means responsive to changes in speed of said engine and related to said thermionic device so that a predetermined speed change of said engine will cause a disproportionately greater change in excitation of said winding.

In testimony whereof, I have signed my name to this specification this second day of June, 1925.

ALAN VARLEY LIVINGSTON.